United States Patent
Nikam et al.

(10) Patent No.: US 10,474,445 B2
(45) Date of Patent: Nov. 12, 2019

(54) UPDATING DEPENDENT SERVICES

(71) Applicant: Microsoft Technology Licensing, LLC, Redmond, WA (US)

(72) Inventors: Shailesh Nikam, Redmond, WA (US); YenPing Yu, Federal Way, WA (US); Zhonghua Chu, Redmond, WA (US); Satish Thomas, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 15/182,354

(22) Filed: Jun. 14, 2016

(65) Prior Publication Data

US 2017/0161051 A1 Jun. 8, 2017

Related U.S. Application Data

(60) Provisional application No. 62/264,250, filed on Dec. 7, 2015.

(51) Int. Cl.
| | | |
|---|---|---|
| *G06F 8/65* | (2018.01) | |
| *G06F 16/901* | (2019.01) | |
| *G06F 11/14* | (2006.01) | |
| *H04L 29/08* | (2006.01) | |
| *G06F 9/48* | (2006.01) | |

(52) U.S. Cl.
CPC .............. *G06F 8/65* (2013.01); *G06F 9/485* (2013.01); *G06F 11/1464* (2013.01); *G06F 16/9024* (2019.01); *H04L 67/16* (2013.01); *H04L 67/34* (2013.01); *G06F 2201/84* (2013.01)

(58) Field of Classification Search
CPC . H04L 67/16; H04L 67/34; G06F 8/65; G06F 9/485; G06F 11/1464; G06F 17/30958; G06F 2201/84
See application file for complete search history.

(56) References Cited

U.S. PATENT DOCUMENTS

| | | | |
|---|---|---|---|
| 5,978,916 A | 11/1999 | Randall | |
| 7,072,936 B2 | 7/2006 | Sturtevant et al. | |
| 7,177,934 B2 | 2/2007 | Matena et al. | |
| 7,370,322 B1 * | 5/2008 | Matena | G06F 8/65 709/217 |
| 7,376,951 B1 | 5/2008 | Yip et al. | |

(Continued)

OTHER PUBLICATIONS

"Virtual SAN Configurations," Published on: Oct. 17, 2014, Available at: https://www.datacore.com/SSV-Webhelp/Virtual_SAN_Configurations.htm.

(Continued)

*Primary Examiner* — Wei Y Zhen
*Assistant Examiner* — Amir Soltanzadeh
(74) *Attorney, Agent, or Firm* — Mannava & Kang, P.C.

(57) ABSTRACT

An update system is provided that performs a stop of that service at each machine that hosts that service such that a service that is dependent on another service stops before that other service starts performing a stop. After a machine hosting a service stops, the update system performs an update of that service on that machine. The update system then performs a start of that service at each machine that hosts that service such than a service that another service depends on starts before that other service starts performing a start.

15 Claims, 11 Drawing Sheets

(56) References Cited

U.S. PATENT DOCUMENTS

| | | |
|---|---|---|
| 7,603,442 B2 | 10/2009 | Sen |
| 8,010,504 B2 | 8/2011 | Ashok et al. |
| 8,561,050 B2 | 10/2013 | Periyasamy |
| 8,826,264 B1 | 9/2014 | Chhabra et al. |
| 9,058,205 B2 * | 6/2015 | Yadav ................... G06F 9/485 |
| 9,122,556 B2 | 9/2015 | Mahajan |
| 2003/0009752 A1 * | 1/2003 | Gupta ..................... G06F 8/65 717/171 |
| 2008/0120400 A1 * | 5/2008 | Keller ................... G06Q 10/06 709/223 |
| 2012/0079502 A1 | 3/2012 | Kwan et al. |
| 2013/0232463 A1 | 9/2013 | Nagaraja et al. |
| 2013/0232480 A1 * | 9/2013 | Winterfeldt ............... G06F 8/60 717/177 |
| 2014/0130036 A1 | 5/2014 | Gurikar et al. |
| 2014/0282472 A1 | 9/2014 | Vinograd et al. |
| 2015/0082296 A1 | 3/2015 | Thomas et al. |

OTHER PUBLICATIONS

"International Search Report and Written Opinion Issued in PCT Application No. PCT/US2016/065205", dated Sep. 3, 2017, 12 Pages.

Peterson, Neil, "Complex Maintenance Using System Center 2012 Configuration Manager and Orchestrator: Patching a Cluster", Retrieved from: https://channel9.msdn.com/Events/MMS/2013/UD-B341, Apr. 1, 2013, 4 Pages.

Peterson, Neil, "TechNet Cluster Patching Runbooks", Retrieved from: https://gallery.technet.microsoft.com/Cluster-Patching-Runbooks-5bda907a#content, Apr. 1, 2013, 1 Page.

Rueefli, Michael, "Using DSC to keep SMA Runbook Workers up-to-date", Retrieved from: http://www.miru.ch/using-dsc-to-keep-sma-runbook-workers-up-to-date/, Feb. 28, 2014, 4 Pages.

* cited by examiner

| server | services |
|--------|----------|
| 001 | A |
| 002 | A, B |
| 003 | D, E |
| 004 | D, E |
| 005 | D, E |
| 006 | C, D |
| 007 | F |
| 008 | A |
| 009 | A |
| 010 | F |
| 011 | G |
| 012 | G |
| 013 | H, I |
| 014 | H |
| 015 | H |
| 016 | I |

*FIG. 1b*

UPDATING DEPENDENT SERVICES

CROSS-REFERENCE TO RELATED APPLICATION

This application claims the benefit of U.S. Provisional Application No. 62/264,250, filed on Dec. 7, 2015, which is hereby incorporated by reference in its entirety. In cases in which a document incorporated by reference herein is inconsistent with contents of this application, the contents of this application control.

BACKGROUND

Organizations may rely on various computer applications (referred to as "services") to provide functions needed by the organization. These services may be part of a customer relationship management ("CRM") system, an enterprise resource planning ("ERP") system, a human resource ("HR") system, and so on. The services may include accounting applications (e.g., general ledger), payroll applications, benefits applications, database applications, point of sale applications, inventory applications, and so on. A large organization may use tens and even hundreds of services that are provided by various service providers. An organization may host the services on servers of a data center of the organization or servers of a cloud infrastructure system. Each service may be hosted on multiple servers, and each server may host multiple services.

From time to time, a service provider will provide updates to its service. For example, a provider of a payroll service may provide an update that fixes a problem with the payroll service or that adds a new feature needed to satisfy a new statutory requirement. As another example, a provider of a publisher/subscriber system may provide an update to support a new communications protocol. To update a service, the service typically needs to be stopped. The update can then be installed, and the service can then be restarted.

The updating of a service can be problematic because various services of an organization may rely on other services of an organization. For example, a retail service may rely on an inventory service, which may in turn rely on a database service. Because of this reliance, if one service fails or stops, the services that rely on it may fail in some way. For example, if a database service stops, then an inventory service may also fail and the inventory data stored by the database service may be left in a corrupt state. Thus, the stopping of one service when installing an update may result in a cascade of failures in other services. To prevent such a cascade of failures, an organization may shutdown all services of the organization when installing one or more updates.

SUMMARY

An update system performs a stop of that service at each machine that hosts that service such that a service that is dependent on another service stops before that other service starts performing a stop. After a machine hosting a service stops, the update system performs an update that service on that machine. The update system then performs a start of that service at each machine that hosts that service such than a service that another service depends on starts before that other service starts performing a start.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 1b is a table that illustrates an example of servers of an organization and the services that each server hosts.

DETAILED DESCRIPTION

Figure 1A:
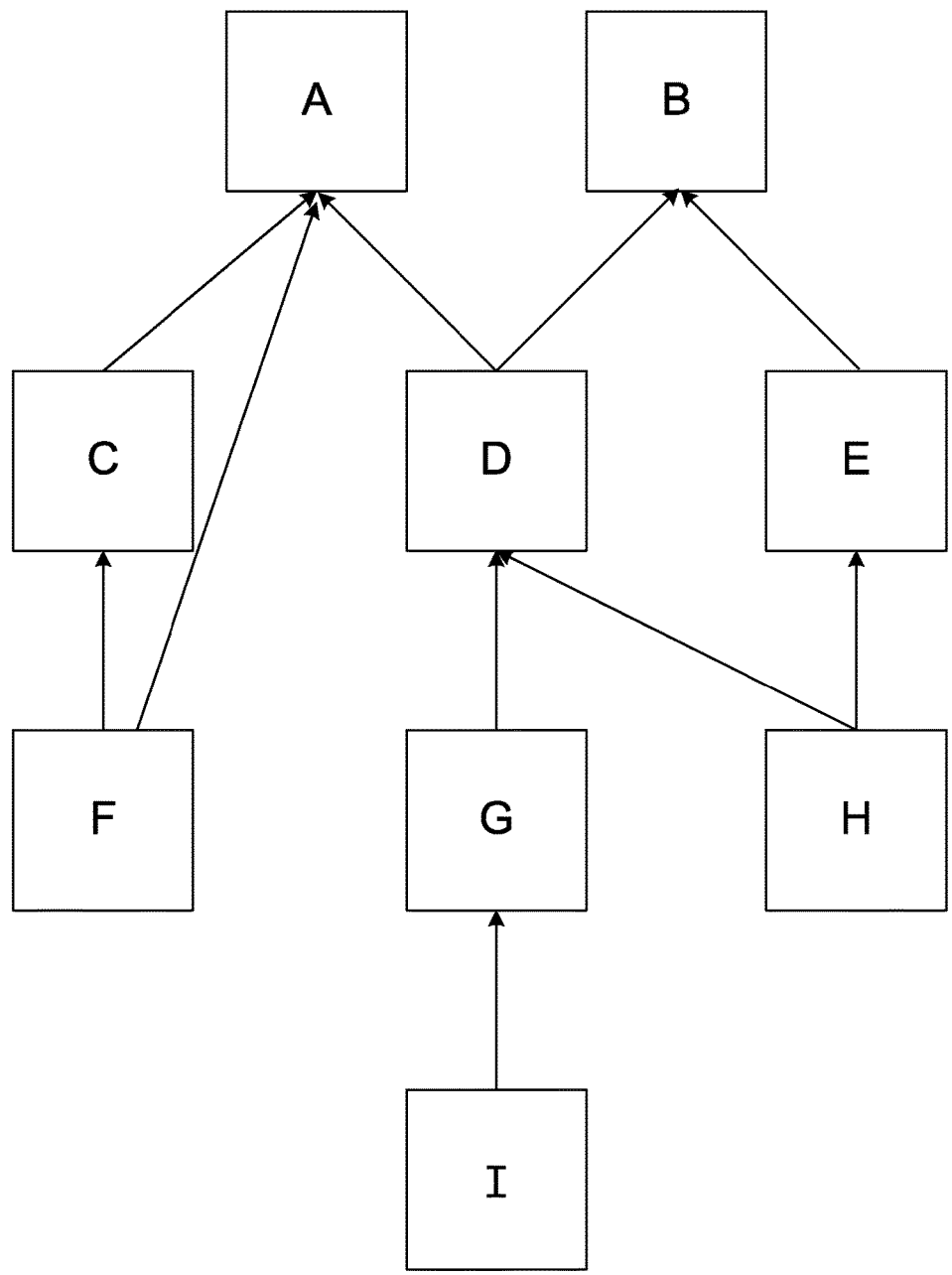
FIG. 1a is a block diagram that illustrates a service dependency graph.

A method and system for automatically installing updates based on selective stoppage of services is provided. In some embodiments, an update system generates a runbook of steps to be performed when installing updates. Each step of the runbook specifies a machine, a service, and an action to take. For example, a step may specify that a stop action is to be taken by machine X for service A or that an update action is to be taken by machine Y for service B. The steps of the runbook may have an ordering or dependency that is implicit or explicit. For example, an implicit ordering may indicate that the first step needs to complete before the second step is started, the second needs to complete before the third step is started, and so on. An explicit ordering may be that each step explicitly states the steps that need to complete before it can start. For example, the fifth step may indicate that the second and fourth steps need to complete before it can start.

In some embodiments, the update system specifies an update interface that is to be provided for each service. The update system interacts with the update interfaces of the services to affect the updating of services. The update interface for a service exposes actions that are to be invoked (e.g., scripts to run) by the update system. The actions include stop, backup, update, start, and restore. A stop action places the service in a condition so that it no longer interacts with other services and can be updated. A update action installs an update for the service. A start action places the service in a condition so that it can interact with other services. The backup action generates a backup of the service prior to an update, and the restore action uses the backup to restore in case an update fails. Each service may have an implementation of each action that is customized to the service. For example, one service may simply cause the service to stop executing, and another service may cause the service to continue executing in quiescent state.

In some embodiments, to generate a runbook, the update system identifies the services that would be affected by updates to be installed. For example, a service that is not updated, but relies on a service (i.e., is dependent upon) that is being updated would be affected by the update. For each machine hosting an affected service, the update system adds to the runbook a stop step and a start step for that machine and service. If the service is being updated, the update system also adds an update step for that machine and service. The update system specifies the dependencies of the steps. For example, the stop steps for each machine that hosts a certain service may need to complete before any update steps for that service can start. As another example, the stop steps for each machine that hosts a service that relies on (i.e., depends upon) another service may need to complete before the stop steps for that other service starts. In some embodiments, the update system may generate an update runbook and a restore runbook. The update runbook specifies how to update the service, and a restore runbook specifies how to restore updated services in case of a failure during an update.

In some embodiments, to execute a runbook, the update system may make the runbook and the updates accessible to each machine of an organization. For example, the runbook and updates may be stored in a central location or may be stored at each machine. The update system executing on each machine may sequence through the runbook to determine whether all the dependencies for a step for a service executing on that machine have been satisfied. If so, the update system invokes that action of that step. The update system then marks that step as complete to indicate that any dependencies on that step have been satisfied.

In some embodiments, the update system updates services hosted by machines. For each service affected by an update, the update system performs a stop of that service at each machine that hosts that service such that a service that is dependent on another service stops before that other service starts performing a stop. For each service to be updated, after a machine hosting the service stops, the update system performs an update that service on that machine. The update system then, for each service affected by an update, performs a start of that service at each machine that hosts that service such than a service that another service depends on starts before that other service starts performing a start.

FIG. 1a is a block diagram that illustrates a service dependency graph. Each service A through I is represented by a vertex of the service dependency graph, and each directed edge represents a dependency between services. For example, the directed edge from service C to service A indicates that service C depends on service A. Also, the directed edges from service D to services A and B indicate that service D depends on both service A and service B. Service A may correspond to a SQL Server, service C may provide functions for a retail store, and service D may provide inventory functions. Both services C and D are dependent on service A because they access data of the SQL server. A service dependency graph is an acyclic directed graph.

An organization (e.g., company) that uses services A through I may host the services on machines (e.g., servers) of a data center of the organization or on machines of a cloud infrastructure provider. A machine that hosts a service may be a physical computer or a virtual machine hosted by a physical computer. Each service may be hosted by one or more machines, and each machine may host one or more services. FIG. 1b is a table that illustrates an example of servers of an organization and the services that each server hosts. For example servers 001, 002, 008, and 009 each host service A, and server 002 also hosts service B.

Figure 2A:
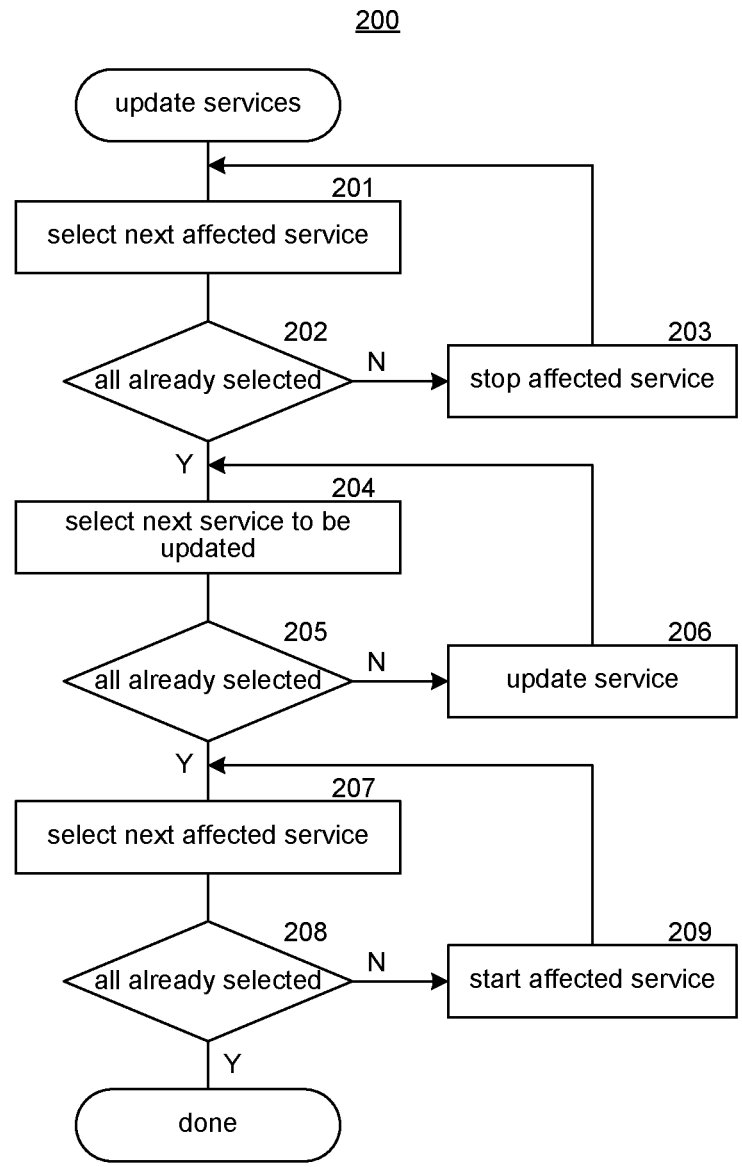
FIG. 2a is a flow diagram that illustrates processing of the update system in some embodiments.

FIG. 2a is a flow diagram that illustrates processing of the update system in some embodiments. The update systems stops affected services, updates services, and then starts affected services. In block 201, the update system selects the next affected service such that a service that is dependent on another service is selected before that other service is selected. In decision block 202, if all the affected services have already been selected, then the update system continues at block 204, else the update system continues at block 203. In block 203, the update system stops the selected affected service and then loops to block 201 to select the next affected service. In block 204, the update system selects the next service to be updated. In decision block 205, if all such services have already been selected, then the update system continues at block 207, else the update system continues at block 206. In block 206, the update system updates the selected service and then loops to block 204 to select the next service to be updated. In block 207, the update system selects the next affected service such that a service that is dependent on another service is selected after that other service is selected. In decision block 208, if all the affected services have already been selected, then the update system completes, else the update system continues at block 209. In block 209, the update system starts the selected affected service and then loops to block 207 to select the next affected service.

Figure 2B:
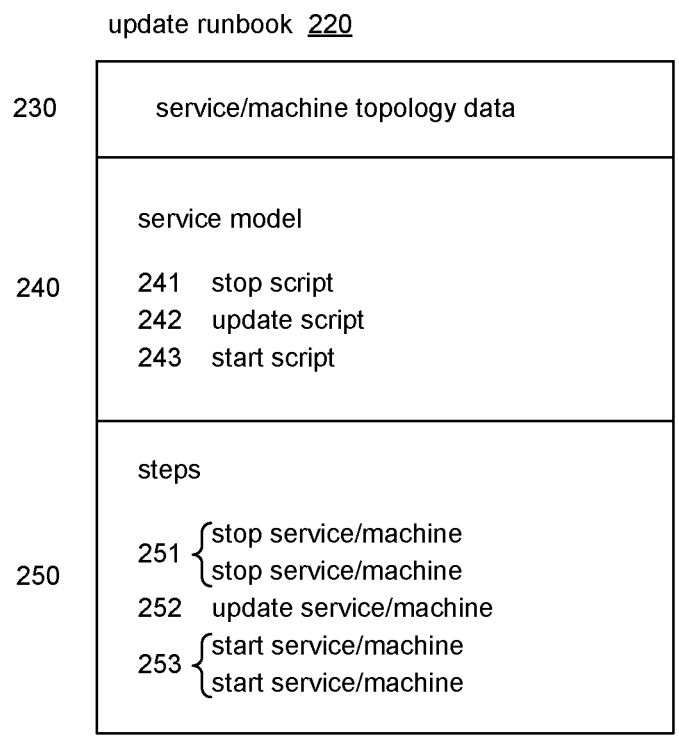
FIG. 2b is a block diagram that illustrates layout of an update runbook in some embodiments.

FIG. 2b is a block diagram that illustrates layout of an update runbook in some embodiments. The update runbook 220 includes service/machine topology data 230, service models 240, and steps 250. The service/machine topology data provides a mapping of the services hosted by each machine. Each service model provides a description of the update interface for a service that includes a stop script 241, an update script 242, and a start script 243. The steps includes stop steps 251 to stop affected services hosted by machines, update steps 252 to update services hosted by machines, and start steps 253 to start services hosted by machines.

Figure 3:
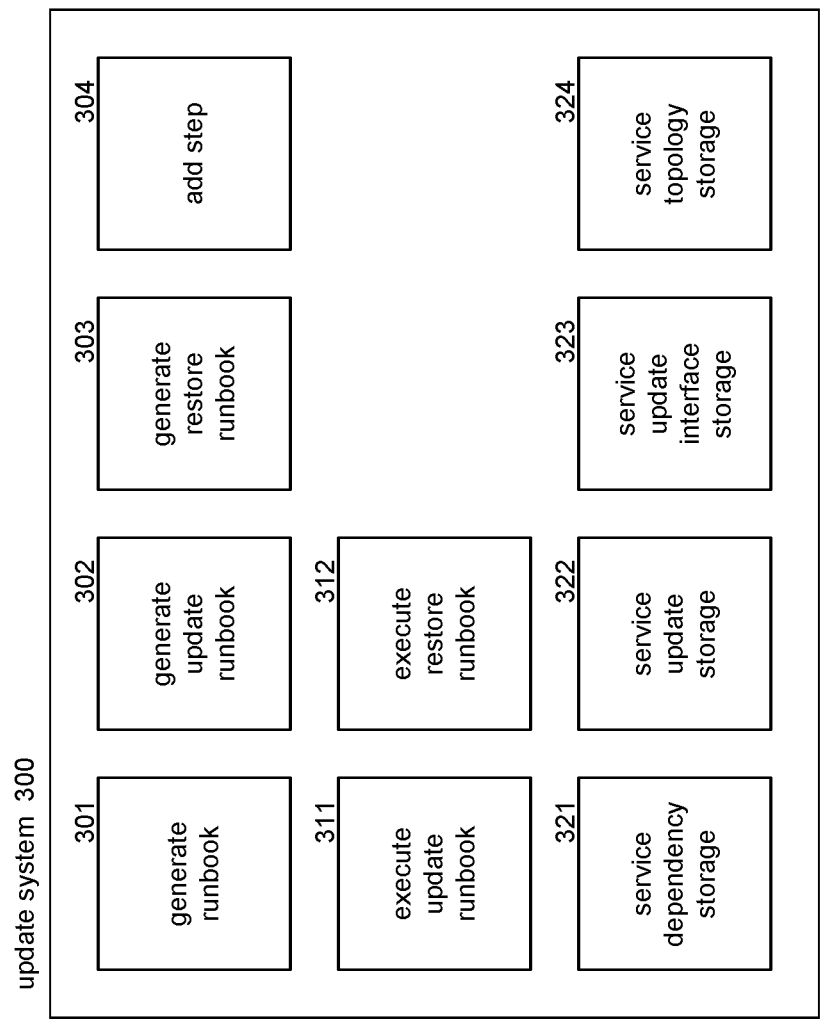
FIG. 3 is a block diagram that illustrates components of an update system in some embodiments.

FIG. 3 is a block diagram that illustrates components of an update system in some embodiments. An update system 300 includes a generate runbook component 301, a generate update runbook component 302, a generate restore runbook component 303, and an add step component 304. The update system also includes an execute update runbook component 311 and an execute restore runbook component 312. The update system includes a service dependency storage 321, a service update storage 322, a service update interface storage 323, and a service topology storage 324. The generate runbook component invokes the generate update runbook component and the generate restore runbook component to generate an update runbook and a restore runbook. The generate update runbook component generates an update runbook, and the generate restore runbook component generates a restore runbook. The add step component is invoked to add a step to the runbook. The execute update runbook component is invoked to execute an update runbook, and the execute restore runbook component is invoked to execute a restore runbook. The service dependency storage stores the service dependency graph of an organization. The service update storage stores information relating to the updates of various services. Information pertaining to updates to be installed for a service may be generated by a system such as that described in U.S. patent application Ser. No. 14/151,289, entitled "Automatic Installation of Selected Updates in Multiple Environments" and filed on Jan. 9, 2014, which is hereby incorporated by reference. The service update interface storage stores an update interface description for each service. The service topology storage stores the mapping of services to machines such as that illustrated by FIG. 2a. The update system may include or interact with a service topology discovery component that automatically discovers the mapping of services to machines by, for example, retrieving from each machine a mapping that is updated when a service is installed or uninstalled.

The computing systems on which the update system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of clients may include desktop computers, laptops, tablets, e-readers, personal digital assistants, smartphones, gaming devices, servers, and so on. The computing systems of servers may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the update system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The update system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the update system may be implemented in hardware using, for example, an application-specific integrated circuit (ASIC).

Table 1 contains an example runbook in an Extensible Markup Language ("XML") format. A runbook may be implemented in various formats using various data structures. For example, each line of a runbook may be stored as a row of database table; the start, stop, and update steps may be stored in separate files; the runbook may comprises a separate sub-runbook for each machine that includes the steps to be executed at that machine; and so on.

TABLE 1

| | |
|---|---|
| 1 | <?xml version="1.0" encoding="UTF-8"?> |
| 2 | <RunbookData xmlns:xsi="http://www.w3.org/2001/XMLSchema-instance" |
| 3 | xmlns:xsd="http://www.w3.org/2001/XMLSchema"> |
| 4 |   <RunbookID>HotfixPackage38</RunbookID> |
| 5 |   − <RunbookTopologyData> |
| 6 |     <Name>AX topology</Name> |
| 7 |     − <MachineList> |
| 8 |       − <Machine> |
| 9 |         <Name>AosServer001</Name> |
| 10 |         − <ServiceModelList> |
| 11 |           <string>AOSService</string> |
| 12 |         </ServiceModelList> |
| 13 |       </Machine> |
| 14 |       − <Machine> |
| 15 |         <Name>RetailServer001</Name> |
| 16 |         + <ServiceModelList> |
| 17 |       </Machine> |
| 18 |       − <Machine> |
| 19 |         <Name>Performance001</Name> |
| 20 |         − <ServiceModelList> |
| 21 |           <string>PerfSDK</string> |
| 22 |         </ServiceModelList> |
| 23 |       </Machine> |
| 24 |     </MachineList> |
| 25 |   </RunbookTopologyData> |
| 26 |   − <RunbookServiceModelData> |
| 27 |     <Guid>76f46b4f-1849-4927-9da2-6c349430f349</Guid> |
| 28 |     <Version>1.0.0.0</Version> |
| 29 |     − <ServiceModelList> |
| 30 |       − <ServiceModel> |
| 31 |         <Name>AOSService</Name> |
| 32 |         <SelectedForUpdate>true</SelectedForUpdate> |
| 33 |         <ContainDatabase>true</ContainDatabase> |
| 34 |         <DependentServiceModelList/> |
| 35 |         − <StopScript> |
| 36 |           <FileName>AutoStopAOS.ps1</FileName> |
| 37 |           <Automated>true</Automated> |
| 38 |           <Description>Stop AOS service and Batch service</Description> |
| 39 |           <RetryCount>0</RetryCount> |
| 40 |         </StopScript> |
| 41 |         − <BackupScript> |
| 42 |           <FileName>AutoBackupAOSService.ps1</FileName> |

TABLE 1-continued

```
43              <Automated>true</Automated>
44              <Description>backup AOS service</Description>
45              <RetryCount>0</RetryCount>
46          </BackupScript>
47       - <BackupConfigScript>
48              <FileName/>
49              <Automated>false</Automated>
50              <Description/>
51              <RetryCount>0</RetryCount>
52          </BackupConfigScript>
53       - <RestoreScript>
54              <FileName>AutoRestoreAOSService.ps1</FileName>
55              <Automated>true</Automated>
56              <Description>restore AOS service</Description>
57              <RetryCount>0</RetryCount>
58          </RestoreScript>
59       - <RestoreConfigScript>
60              <FileName/>
61              <Automated>false</Automated>
62              <Description/>
63              <RetryCount>0</RetryCount>
64          </RestoreConfigScript>
65       - <UpdateScript>
66              <FileName>AutoUpgradeAOSService.ps1</FileName>
67              <Automated>true</Automated>
68              <Description>update AOS service</Description>
69              <RetryCount>0</RetryCount>
70          </UpdateScript>
71       - <StartScript>
72              <FileName>AutoStartAOS.ps1</FileName>
73              <Automated>true</Automated>
74              <Description>Start AOS service and Batch service</Description>
75              <RetryCount>0</RetryCount>
76          <StartScript>
77       <ServiceModel>
78     - <ServiceModel>
79          <Name>PerfSDK</Name>
80          <SelectedForUpdate>true</SelectedForUpdate>
81          <ContainDatabase>false</ContainDatabase>
82       - <DependentServiceModelList>
83              <string>AOSService</string>
84          </DependentServiceModelList>
85       - <StopScript>
86              <FileName>AutoStopPerfSDK.ps1</FileName>
87              <Automated>true</Automated>
88              <Description/>
89              <RetryCount>0</RetryCount>
90          <StopScript>
91       - <BackupScript>
92              <FileName>AutoBackupPerfSDK.ps1</FileName>
93              <Automated>true</Automated>
94              <Description>backup Perf SDK</Description>
95              <RetryCount>0</RetryCount>
96          </BackupScript>
97       - <BackupConfigScript>
98              <FileName/>
99              <Automated>false</Automated>
100             <Description/>
101             <RetryCount>0</RetryCount>
102         </BackupConfigScript>
103      - <RestoreScript>
104             <FileName>AutoRestorePerfSDK.ps1</FileName>
105             <Automated>true</Automated>
106             <Description>restore Perf SDK</Description>
107             <RetryCount>0</RetryCount>
108         </RestoreScript>
109      - <RestoreConfigScript>
110             <FileName/>
111             <Automated>false</Automated>
112             <Description/>
113             <RetryCount>0</RetryCount>
114         </RestoreConfigScript>
115      - <UpdateScript>
116             <FileName>UpdatePerfSDK.ps1</FileName>
117             <Automated>true</Automated>
118             <Description/>
119             <RetryCount>0</RetryCount>
120         </UpdateScript>
121      - <UpdateConfigScript>
122             <FileName/>
```

TABLE 1-continued

```
123            <Automated>false</Automated>
124            <Description/>
125            <RetryCount>0</RetryCount>
126          </UpdateConfigScript>
127        - <StartScript>
128            <FileName/>
129            <Automated>false</Automated>
130            <Description/>
131            <RetryCount>0</RetryCount>
132          </StartScript>
133        </ServiceModel>
134      </ServiceModelList>
135    </RunbookServiceModelData>
136  - <RunbookStepList>
137    - <Step>
138        <ID>1</ID>
139        <DependentStepID/>
140        <Description>Stop script for service model: PerfSDK on machine:
141            Performance001</Description>
142        <MachineName>Performance001</MachineName>
143        <ServiceModelName>PerfSDK</ServiceModelName>
144      - <ScriptToExecute>
145          <FileName>AutoStopPerfSDK.ps1</FileName>
146          <Automated>true</Automated>
147          <Description/>
148          <RetryCount>0</RetryCount>
149        </ScriptToExecute>
150        <StartTime>0001-01-01T00:00:00</StartTime>
151        <EndTime>9999-12-31T23:59:59.9999999</EndTime>
152        <StepState>NotStarted</StepState>
153      </Step>
154    - <Step>
155        <ID>2</ID>
156        <DependentStepID>1</DependentStepID>
157        <Description>Stop script for service model: AOSService on machine:
158            AosServer001</Description>
159        <MachineName>AosServer001</MachineName>
160        <ServiceModelName>AOSService</ServiceModelName>
161      - <ScriptToExecute>
162          <FileName>AutoStopAOS.ps1</FileName>
163          <Automated>true</Automated>
164          <Description>Stop AOS service and Batch service</Description>
165          <RetryCount>0</RetryCount>
166        </ScriptToExecute>
167        <StartTime>0001-01-01T00:00:00</StartTime>
168        <EndTime>9999-12-31T23:59:59.9999999</EndTime>
169        <StepState>NotStarted</StepState>
170      </Step>
171    - <Step>
172        <ID>3</ID>
173        <DependentStepID>2</DependentStepID>
174        <Description>Backup script for service model: AOSService on machine:
175            AosServer001</Description>
176        <MachineName>AosServer001</MachineName>
177        <ServiceModelName>AOSService</ServiceModelName>
178      - <ScriptToExecute>
179          <FileName>AutoBackupAOSService.ps1</FileName>
180          <Automated>true</Automated>
181          <Description>backup AOS service</Description>
182          <RetryCount>0</RetryCount>
183        </ScriptToExecute>
184        <StartTime>0001-01-01T00:00:00</StartTime>
185        <EndTime>9999-12-31T23:59:59.9999999</EndTime>
186        <StepState>NotStarted</StepState>
187      </Step>
188    - <Step>
189    </RunbookStepList>
190    <RunbookLogs/>
191  - <RunbookRestoreStepList>
192    - <Step>
193        <ID>11</ID>
194        <DependentStepID>6</DependentStepID>
195        <Description>Stop script for service model: AOSService on machine:
196            AosServer001</Description>
197        <MachineName>AosServer001</MachineName>
198        <ServiceModelName>AOSService</ServiceModelName>
199      - <ScriptToExecute>
200          <FileName>AutoStopAOS.ps1</FileName>
201          <Automated>true</Automated>
202          <Description>Stop AOS service and Batch service</Description>
```

TABLE 1-continued

```
203         <RetryCount>0</RetryCount>
204       </ScriptToExecute>
205       <StartTime>0001-01-01T00:00:00</StartTime>
206       <EndTime>9999-12-31T23:59:59.9999999</EndTime>
207       <StepState>NotStarted</StepState>
208     </Step>
209   - <Step>
210       <ID>10</ID>
211       <DependentStepID>9</DependentStepID>
212       <Description>No Operation required to restore this step - skipping
213       GlobalUpdate script for service model: RetailServer on machine:
214         RetailServer001</Description>
215       <MachineName>RetailServer001</MachineName>
216       <ServiceModelName>RetailServer</ServiceModelName>
217     - <ScriptToExecute>
218         <FileName>[NoOperationRequired]</FileName>
219         <Automated>true</Automated> <Description/>
220         <RetryCount>0</RetryCount>
221       </ScriptToExecute>
222       <StartTime>0001-01-01T00:00:00</StartTime>
223       <EndTime>9999-12-31T23:59:59.9999999</EndTime>
224       <StepState>NotStarted</StepState>
225     </Step>
226   - <Step>
227       <ID>9</ID>
228       <DependentStepID>6</DependentStepID>
229       <Description>No Operation required to restore this step - skipping Update
230       script for service model: RetailServer on machine:
231       RetailServer001</Description>
232       <MachineName>RetailServer001</MachineName>
233       <ServiceModelName>RetailServer</ServiceModelName>
234     - <ScriptToExecute>
235         <FileName>[NoOperationRequired]</FileName>
236         <Automated>true</Automated>
237         <Description>Update Retail Server service.</Description>
238         <RetryCount>0</RetryCount>
239       </ScriptToExecute>
240       <StartTime>0001-01-01T00:00:00</StartTime>
241       <EndTime>9999-12-31T23:59:59.9999999</EndTime>
242       <StepState>NotStarted</StepState>
243     </Step>
244   - <Step>
245   </RunbookRestoreStepList>
246     <RunbookRestoreLogs/>
247 </RunbookData>
```

The "RunbookTopologyData" tags (lines 5-25) delimit a description of the service topology. For example, the machine with a name "AosServer001" (lines 9-11) hosts the service named "AOSService."

The "RunbookServiceModel" tags (lines 26-135) delimit a description of the update interface for each service. The update interface for a service provides a script for each action defined by the update system. These actions include stop, start, backup, restore, and update. The update system executes the stop script to stop the service, the start script to start a service, the backup script to back up the service prior to an update, the restore script to restore a backup, and the update script to update the service. For example, the service named "AOSService" (line 31) includes tags that include "StopScript" (lines 35-40), "BackupScript" (lines 41-46), "RestoreScript" (lines 53-64), "UpdateScript" (lines 65-70), and "StartScript" (lines 71-76). For example, the "StopScript" tags delimit a description of the stop script. The "FileName" tags (line 36) delimit the name of the file (i.e., "AutoStopAOS.ps1") that contains to stop script. The "Automated" tags (line 37) delimit a flag that indicates whether the action is automated or manual. The "RetryCount" tags (line 39) delimit a count of the number of retries to take if the stop script fails.

The "RunbookStepList" tags (lines 136-189) delimit the steps of the update runbook, and the "RunbookRestoreStepList" tags (lines 191-245) delimit the steps of the restore runbook. "Step" tags delimit each step of a runbook. The first step of the update runbook contains the identifier of "1" (line 138), machine name of "Performance001" (line 142), and the service name of "PerfSDK" (line 143). The "ScriptToExecute" tags (lines 144-149) delimit a description of the script to be executed for this step. In this example, the name of the script is "AutoStopPerfSDK.ps1" (line 145), which is the stop script described by the "RunbookServiceModel" for the "PerfSDK" service. Each step also contains "StartTime" and "EndTime" tags (lines 150-151) delimit a time that is updated when the step starts and ends. Each step contains "StepState" tags (line 152) to indicate whether the step has started and if started, whether the step is in progress, completed successfully, or failed.

Figure 4:
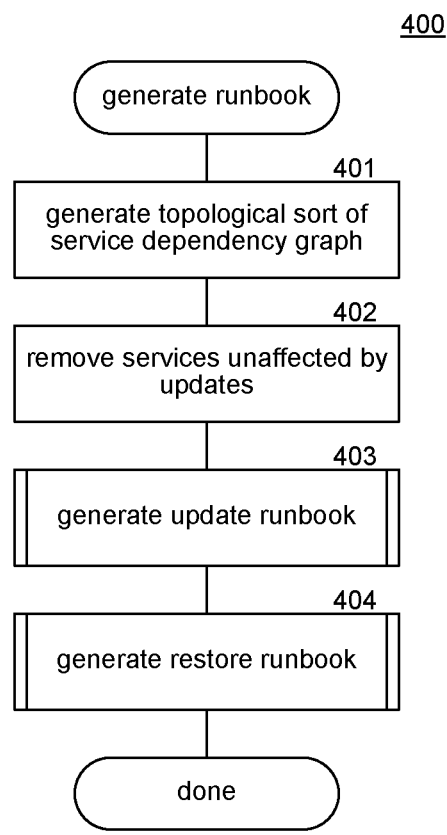
FIG. 4 is a flow diagram that illustrates the processing of a generate runbook component in some embodiments.

FIG. 4 is a flow diagram that illustrates the processing of a generate runbook component in some embodiments. A generate runbook component 400 generates an update runbook and a restore runbook for an update of the services of an organization. In block 401, the component generates a service list that is topological sort of the service dependency graph. A topological sort (actually a reverse topological sort by some definitions) is a linear ordering of a directed acyclic graph such that, for every directed edge, the to-vertex is ordered before the from-vertex. So, the service list would have in some sense the least dependent services at the beginning and the most dependent services at the end. For example, the service list may order the services of FIG. 1a as A, B, C, D, E, F, G, H, and I or as B, A, C, F, D, E, G, I, and H. In block 402, the component removes services that are unaffected by the updates from the service list. For example, the component may identify the least dependent service in the service list that has an associated update and remove from the service list all the services before that service. Continuing with the first order of the service list as described above, if services A, B, and C do not have an update, but service D has an update, the component removes services A, B, and C from the service list. In some embodiments, the component may also remove services E and F from the list because they will also not be affected by an update to service D. In block 403, the component invokes the generate update runbook component. In block 404 the component invokes a generate restore runbook component and then completes.

Figure 5:
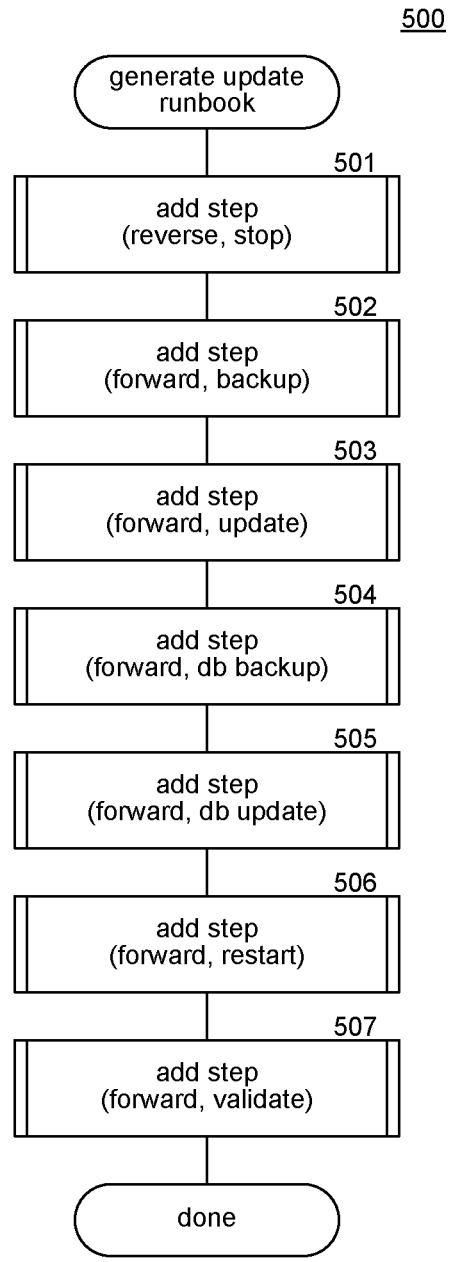
FIG. 5 is a flow diagram that illustrates the processing of a generate update runbook component in some embodiments.

FIG. 5 is a flow diagram that illustrates the processing of a generate update runbook component in some embodiments. A generate update runbook component 500 generates an update runbook by invoking an add step component for each of the scripts that relate to updating a service. In block 501, the component invokes the add step component passing an indication of the reverse direction and an indication of the stop action. The reverse direction means that the add step component will process the service list starting with the most dependent service. In block 502, the component invokes the add step component passing an indication of the forward direction and the backup action. The forward direction means that the add step component processes the service list starting with the least dependent service. In block 503, the component invokes the add step component passing an indication of the forward direction and the update action. In block 504, the component invokes the add step component passing indication of the forward direction and a database backup action. In block 505, the component invokes the add step component passing an indication of the forward direction and the database update action. The database backup and update actions are invoked to allow a database associated with the service to be backed up and then updated. A database provided by a service could, however, be also considered as a separate service. In block 506, the component invokes the add step component passing an indication of the forward direction and the restart action. In block 507, the component invokes the add step component passing an indication of the forward direction and the validate action and then completes.

Figure 6:
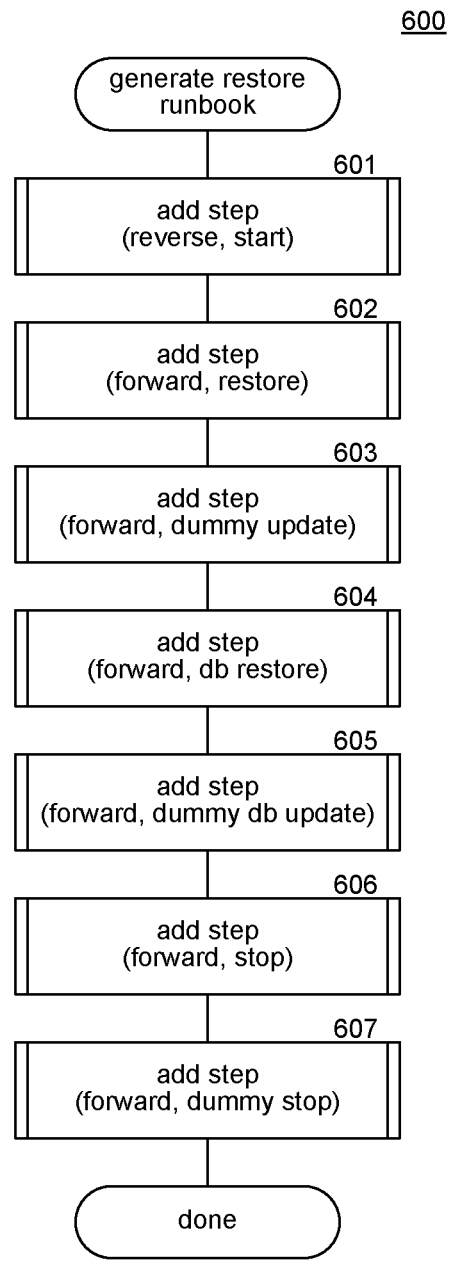
FIG. 6 is a flow diagram that illustrates processing of a generate restore runbook component in some embodiments.

FIG. 6 is a flow diagram that illustrates processing of a generate restore runbook component in some embodiments. A generate restore runbook component 600 generates a restore runbook by invoking an add step component for each of the scripts that relate to restoring a service. In block 601, the component invokes the add step component passing an indication of the reverse direction and the start action. In block 602, the component invokes the add step component passing indication of the forward direction and the restore action. In block 603, the component invokes the add step component passing indication of the forward direction and a dummy update action. A "dummy" actions are simply inserted to maintain symmetry between the steps of the update runbook and the corresponding restore runbook. The update system ignores a step with a "dummy" action. The symmetry makes it easier for an administrator who wants to manually specify at what step to start execution of the restore runbook. In block 604, the component invokes the add step component passing indication of the forward direction and the database restore action. In block 605, the component invokes the add step component passing an indication of the forward direction and a dummy update action. In block 606, the component invokes the add step component passing indication of the forward direction and the stop action. In block 607, the component invokes the add step component passing indication of the forward direction and a dummy stop action and then completes.

Figure 7:
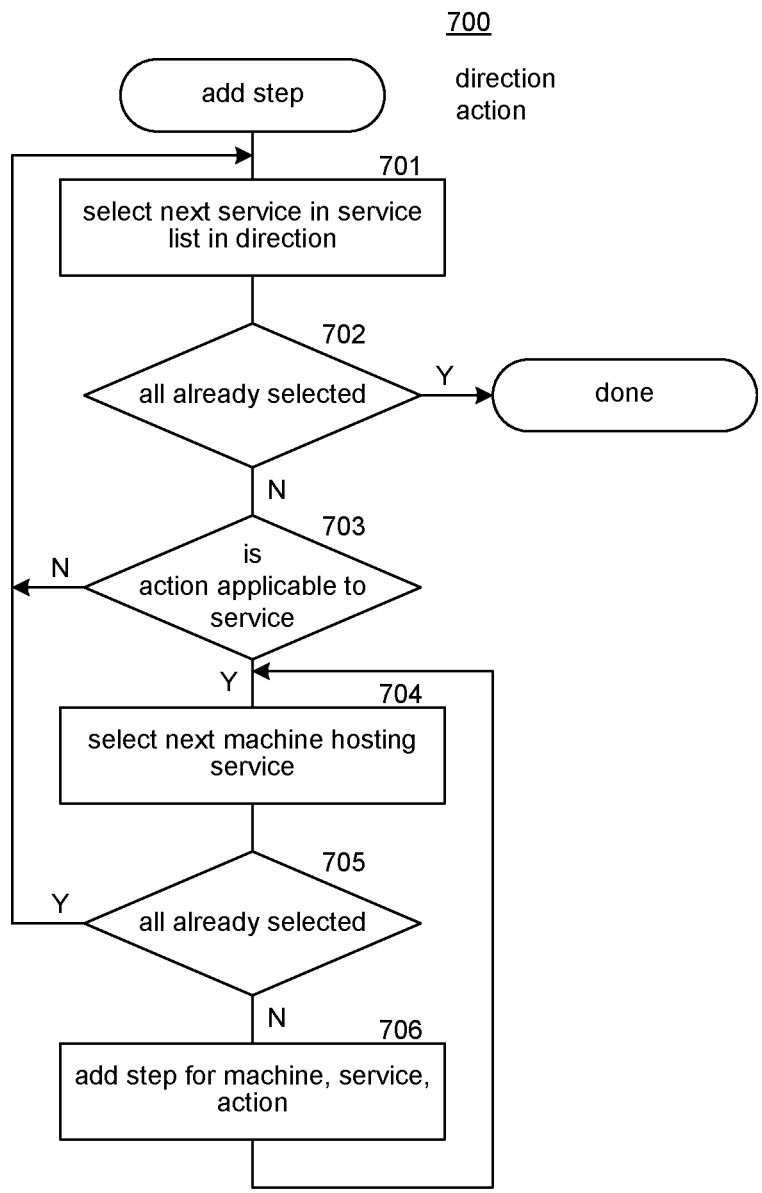
FIG. 7 is a flow diagram illustrates processing of an add step component in some embodiments.

FIG. 7 is a flow diagram illustrates processing of an add step component in some embodiments. An add step component 700 is passed an indication of a direction and an action. The component processes the service list in the indicated direction and adds steps to the runbook for each machine that hosts a service to which the action is applicable. In block 701, the component selects the next service in the specified direction. In decision block 702, if all the services have already been selected, then the component completes, else the component continues at block 703. In decision block 703, if the action is applicable to the selected service, then the component continues at block 704, else the component loops to block 701 to select the next service. In block 704, the component selects the next machine that hosts the selected service. In decision block 705, if all the machines that host the selected service have already been selected, then the component loops to block 701 to select the next service, else the component continues at block 706. In block 706, the component adds the step for the selected machine, the selected service, and the action to the runbook and then loops to block 704 to select the next machine that hosts the selected service.

Figure 8:
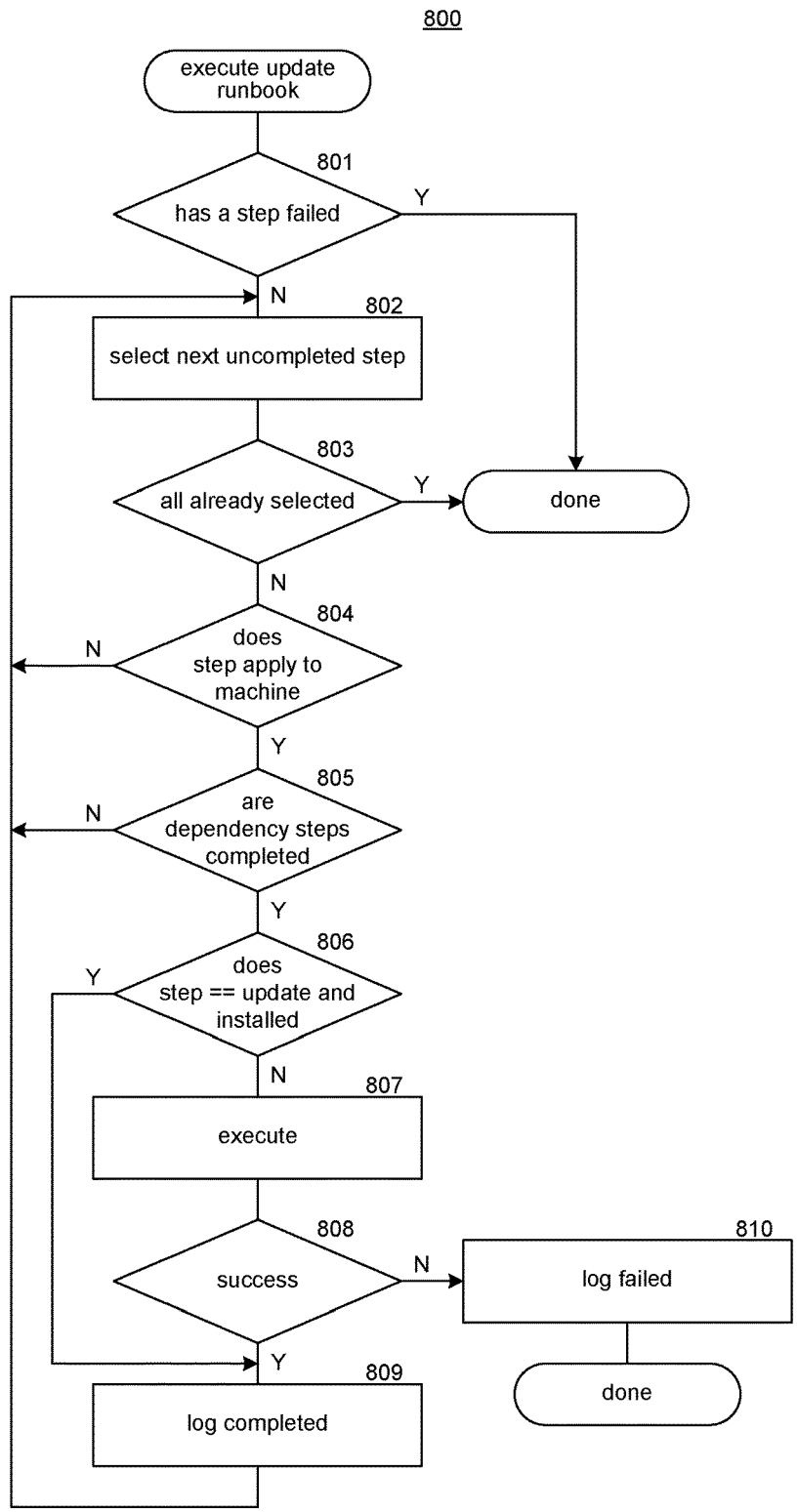
FIG. 8 is a flow diagram that illustrates processing of a execute update runbook component in some embodiments.

FIG. 8 is a flow diagram that illustrates processing of a execute update runbook component in some embodiments. An execute update runbook component 800 is invoked to execute an update runbook. Each machine that is affected by an update may execute the component. The component may be invoked periodically or when the state of an update step changes to determine whether any uncompleted steps have their dependencies satisfied and can thus be executed. In decision block 801, if a step of the update runbook has failed, then the component completes without performing any additional steps of the runbook, else the component continues at block 802. For example, if a machine executed a step that failed, then each machine would effectively stop executing the runbook. In block 802, the component selects the next uncompleted step of the runbook in the forward direction (i.e., from first to last). If the runbook (update or restore) contains explicit dependency information rather than implicit order-based dependencies, then the order in which the steps are selected can be different. Also, any step whose dependencies have been satisfied can be executed. So, some of the machines can be executing steps in parallel or even a single machine can be executing steps for different services in parallel. In decision block 803, if all the uncompleted steps have already been selected, then the component completes, else the component continues at block 804. In decision block 804, if the step is not for the current machine (e.g., the machine running the component or on whose behalf the component is running), then the component loops to block 802 to select the next uncompleted step. In decision block 805, if all the dependencies of the selected step have completed, then the component continues at block 806, else the component loops to block 802 to select the next uncompleted step. In decision block 806, if the selected step is for an update, but the update has already been installed, then the component continues at block 809, else the component continues at block 807. In block 807, the component executes the selected step. The component may set the start time and update the step state to indicate that the step is in progress. If the step is not a manual step, then the component executes the script specified by the step. If the step is a manual step, then the component waits for administrator to indicate that the selected step has been completed. In decision block 808, if the selected step has been completed successfully, then the component continues at block 809, else the component continues at block 810. In block 809, the component logs that the selected step has been completed such as by setting the end time and updating the step state and then loops to block 802 to select the next uncompleted step. In block 810, the component logs an indication of failure and may set the end time and update step state to indicate the failure and then completes.

Figure 9:
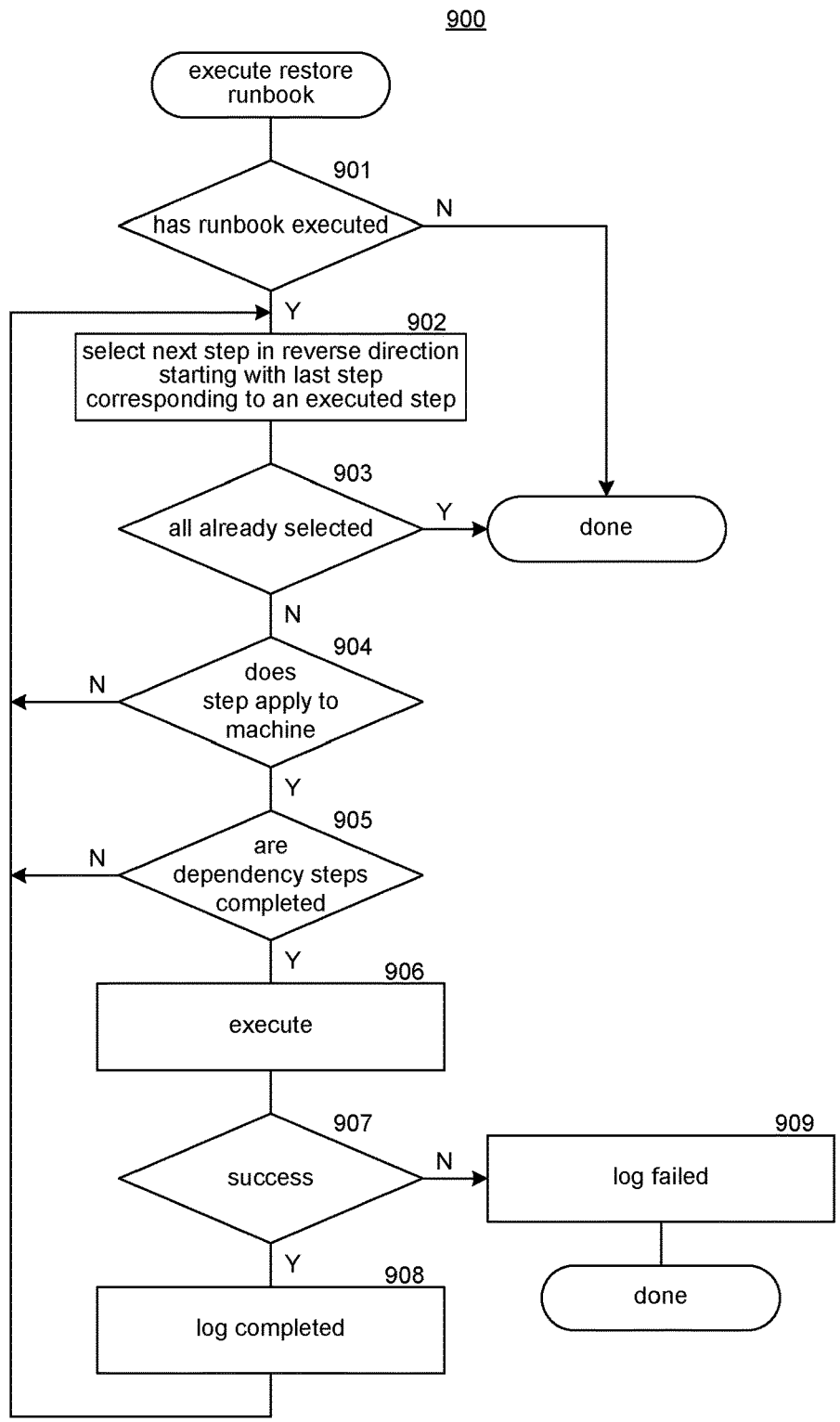
FIG. 9 is a flow diagram that illustrates the processing of an execute restore runbook component in some embodiments.

FIG. 9 is a flow diagram that illustrates the processing of an execute restore runbook component in some embodiments. An execute restore runbook component 900 is invoked to execute a restore runbook. In decision block 901, if the runbook has executed, then the component continues at block 902, else the component completes. In block 902, the component selects the next uncompleted step of the runbook in the reverse direction (i.e., from last to first). In decision block 903, if all the uncompleted steps have already been selected, then the component completes, else the component continues at block 904. In decision block 904, if the selected step is not for the current machine, then the component loops to block 902 to select the next step, else the component continues at block 905. In decision block 905, if all dependencies of selected step have completed, then the component continues at block 906, else the component loops to block 902 to select the next uncompleted step. In decision block 906, the component executes the selected step. If the selected step is not a manual step, then the component executes the script specified by the step. If the selected step is a manual step, then the component waits for an administrator to indicate that that step has been manually completed. In decision block 907, if the step that has been completed successfully, then the component continues at block 908, else the component continues at block 909. In block 908, the component logs that the step has been completed by, for example, updating the start and end time in the step state in the runbook and then loops to block 902 to select the next uncompleted step. In block 910, the component logs an indication of failure and then completes. The component sets the start and end times and updates the step state as described above for the execute update runbook component.

The following paragraphs describe various embodiments of aspects of the update system. An implementation of update system may employ any combination of the embodiments. The processing described below may be performed by a computing device with a processor that executes computer-executable instructions stored on a computer-readable storage medium that implements the update system.

In some embodiments, a method performed by a computing system for updating services hosted by machines is provided. The method generates an update runbook with steps for updating the services where each step indicates a target service, a machine that hosts that target service, and an action. The actions are stop, update, and start. The update runbook includes a step with a stop action and a step with a start action for each service on each machine affected by an update and a step with an update action for each service on each machine to be updated. A service is affected by an update if that service is being updated or depends on a service that is affected by an update. The method executes the update runbook as follows. For each step with a stop action, the method performs a stop of the target service at the machine that hosts the target service such that each service that is dependent on the target service stops before that target service starts performing a stop. For each step with an update action, after the target service stops at the machine that hosts the target service, the method performs an update of that target service at the machine that hosts the service. For each step with a stop action, the method performs a start of the target service at each machine that hosts the target service such that each service affected by an update that that target service depends on stops and then starts before that target service starts performing a start.

In some embodiments, the method further generates a service list that is a topological sort of a service dependency graph wherein each service is stopped in an order from the most dependent service to the least dependent service. In some embodiments, each service is started in an order from the least dependent service to the most dependent service. In some embodiments, the update runbook specifies dependencies between the steps. In some embodiments, a service includes an update interface that exposes actions to be invoked when updating that service. In some embodiments, the actions are invoked by running a script specified for that service. In some embodiments, the update runbook includes a step with a backup action for each service on each machine to be updated.

In some embodiments, a computing system for generating an update runbook that specifies steps for performing an update of a target service hosted by a target machine is provided. The computing system comprises one or more computer-readable storage media storing a service dependency graph indicating dependencies between services and a service topology indicating mappings of services to machines that host the services. The one or more computer-readable media further store computer-executable instructions for controlling a computing device to various acts. The acts include for each service affected by the update of the target service, adding to the update runbook a stop step for that affected service for each machine that hosts that affected service wherein a stop step for an affected service that is dependent on another affected service is indicated to stop before that other affected service starts performing a stop. The acts further include adding to the update runbook an update step for the target service at the target machine wherein the update step is to be executed after the target service stops at the target machine. The acts include for each service affected by the update of the target service, adding to the update runbook a start step for that affected service for each machine that hosts that affected service wherein a start step for an affected service that is dependent on another affected service is indicated to start after that other affected service starts and after the target service is updated. The computing system further comprises a processor for executing the computer-executable instructions stored in the computer-readable storage medium. In some embodiments, the acts further include controlling the computing system to generate a topological sort of the service dependency graph. In some embodiments, the stop steps for the affected services are added in reverse order of the topological sort and the start steps for the affected services are added in order of the topological sort. In some embodiments, the acts further include controlling the computing system to for each service affected by the update of the target service, add to the update runbook a backup step for the target service for the target machine wherein the backup step starts after that target service at the target machine stops. In some embodiments, the acts further include controlling the computing system to generate a restore runbook for restoring the target service should the update of the target service fail. In some embodiments, the acts further include controlling the computing system to store the update runbook in a central location that is accessible by the machines that host an affected service.

In some embodiments, a computer-readable storage medium storing a runbook is provided. The runbook specifies steps for performing an update of a target service hosted by a target machine. The runbook comprises for each service affected by the update of the target service, a stop step for that affected service for each machine that hosts that affected service wherein a stop step for an affected service that is dependent on another affected service is indicated to stop before that other affected service starts performing a stop. The runbook also comprises an update step for the target service at the target machine wherein the update step is to be executed after the target service stops at the target machine. The runbook further comprises for each service affected by the update of the target service, a start step for that affected service for each machine that hosts that affected service wherein a start step for an affected service that is dependent on another affected service is indicated to start after that other affected service starts and after the target service is updated. In some embodiments, each step identifies a script file for performing an action of the step. In some embodiments, the runbook further comprises a backup step for the target service at the target machine wherein the backup step starts after that target service at the target machine stops. In some embodiments, each step indicates whether the step is automated. In some embodiments, each step indicates a number of retries should an action of the step fail. In some embodiments, the runbook further comprises a restore runbook. In some embodiments, the runbook further comprises topology data indicating services on each machine.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system, the method comprising:
generating a service list based on a topological sort of a service dependency graph having a plurality of vertices and a plurality of directed edges, each vertex of the plurality of vertices representing a service of a plurality of services hosted by a plurality of machines, each directed edge of the plurality of directed edges connecting a from-vertex of a pair of vertices to a to-vertex of the pair of vertices, and each directed edge of the plurality of directed edges representing a service dependency between a pair of services represented by the pair of vertices, the topological sort ordering the plurality of services from least dependent services to most dependent services, the service list being a linearly ordered listing of the plurality of services represented by the plurality of vertices such that for each pair of vertices connected by a directed edge of the service dependency graph, a first service represented by the to-vertex of the pair of vertices is listed in the linear ordering before a second service represented by the from-vertex of the pair of vertices;

generating an update runbook with steps for updating the services, an order of the steps being based on the service list, each step indicating a target service, a machine that hosts that target service, and an action, the actions being stop, update, and start, wherein the update runbook includes a step with a stop action and a step with a start action for each service on each machine affected by an update and a step with an update action for each service on each machine to be updated, the order of steps being such that each service is stopped in an order from the most dependent service to the least dependent service and started in an order from the least dependent service to the most dependent service; and executing the update runbook by:
for each step with a stop action, performing a stop of the target service at the machine that hosts the target service such that each service that is dependent on the target service stops before that target service starts performing a stop;
for each step with an update action, after the target service stops at the machine that hosts the target service, performing an update of that target service at the machine that hosts the service; and
for each step with a stop action, performing a start of the target service at each machine that hosts the target service such that each service affected by an update that that target service depends on stops and then starts before that target service starts performing a start wherein a service is affected by an update if that service is being updated or depends on a service that is affected by an update.

2. The method of claim 1 wherein a service includes an update interface that exposes actions to be invoked when updating that service.

3. The method of claim 2 wherein the actions are invoked by running a script specified for that service.

4. The method of claim 1 wherein the update runbook includes a step with a backup action for each service on each machine to be updated.

5. A computing system comprising:
one or more computer-readable storage media storing a service dependency graph having a plurality of vertices and a plurality of directed edges, each vertex of the plurality of vertices representing a service of a plurality of services hosted by a plurality of machines, each directed edge of the plurality of directed edges connecting a from-vertex of a pair of vertices to a to-vertex of the pair of vertices, and each directed edge of the plurality of directed edges representing a service dependency between a pair of services represented by the pair of vertices;
a service topology indicating mappings of services to machines that host the services; and
computer-executable instructions for controlling a computing system to: generate a service list based on a topological sort of the service dependency graph, the topological sort ordering the plurality of services from the least dependent services to the most dependent services, and the service list being a linearly ordered listing of the plurality of services represented by the plurality of vertices such that for each pair of vertices connected by a directed edge of the service dependency graph, a first service represented by the to-vertex of the pair of vertices is listed in the linear ordering before a second service represented by the from-vertex of the pair of vertices;

for each service affected by the update of a target service from the plurality of services, the target service being hosted by a target machine, add to an update runbook a stop step for that affected service for each machine that hosts that affected service based on the service list, such that a stop step for an affected service that is dependent on another affected service is indicated to stop before that other affected service starts performing a stop;

add to the update runbook an update step for the target service at the target machine wherein the update step is to be executed after the target service stops at the target machine; and for each service affected by the update of the target service, add to the update runbook a start step for that affected service for each machine that hosts that affected service, based on the topological sort of the service dependency graph, such that a start step for an affected service that is dependent on another affected service is indicated to start after that other affected service starts and after the target service is updated;

and a processor for executing the computer-executable instructions stored in the one or more computer-readable storage media;

wherein the stop steps for the affected services are added in reverse order of the topological sort and the start steps for the affected services are added in order of the topological sort.

6. The computing system of claim 5 wherein the computer-executable instructions are further for controlling the computing system to, for each service affected by the update of the target service, add to the update runbook a backup step for the target service for the target machine wherein the backup step starts after that target service at the target machine stops.

7. The computing system of claim 6 wherein the computer-executable instructions are further for controlling the computing system to generate a restore runbook for restoring the target service should the update of the target service fail.

8. The computing system of claim 5 wherein the computer-executable instructions are further for controlling the computing system to store the update runbook in a central location that is accessible by the machines that host an affected service.

9. A computer-readable storage medium storing a service list and a runbook, the runbook specifying steps for performing an update of a target service of a plurality of services, the target service being hosted by a target machine, the service list being based on a topological sort of a service dependency graph having a plurality of vertices and a plurality of directed edges, each vertex of the plurality of vertices representing a service of a plurality of services hosted by a plurality of machines, each directed edge of the plurality of directed edges connecting a from-vertex of a pair of vertices to a to-vertex of the pair of vertices, and each directed edge of the plurality of directed edges representing a service between a pair of services represented by the pair of vertices, the topological sort ordering the plurality of services from least dependent services to most dependent services, the service list being a linearly ordered listing of the plurality of services represented by the plurality of vertices such that for each pair of vertices connected by a directed edge of the service dependency graph, a first service represented by the to-vertex of the pair of vertices is listed in the linear ordering before a second service represented by the from-vertex of the pair of vertices, generating an update runbook with steps for updating the services, an order of the steps being based on the service list, each step indicating a target service, a machine that hosts that target service, and an action, where the order of steps being such that each service is stopped in an order from the most dependent service to the least dependent service and started in an order from the least dependent service to the most dependent service; and the runbook comprising:

for each service affected by the update of the target service, a stop step for that affected service for each machine that hosts that affected service wherein a stop step for an affected service that is dependent on another affected service is indicated, based on the service list, to stop before that other affected service starts performing a stop;

an update step for the target service at the target machine wherein the update step is to be executed after the target service stops at the target machine; and for each service affected by the update of the target service, a start step for that affected service for each machine that hosts that affected service wherein a start step for an affected service that is dependent on another affected service is indicated, based on the service list, to start after that other affected service starts and after the target service is updated.

10. The computer-readable storage medium of claim 9 wherein each step identifies a script file for performing an action of the step.

11. The computer-readable storage medium of claim 9 wherein the runbook further comprises a backup step for the target service at the target machine wherein the backup step starts after that target service at the target machine stops.

12. The computer-readable storage medium of claim 9 wherein each step indicates whether the step is automated.

13. The computer-readable storage medium of claim 9 wherein each step indicates a number of retries should an action of the step fail.

14. The computer-readable storage medium of claim 9 wherein the runbook further comprises a restore runbook.

15. The computer-readable storage medium of claim 9 wherein the runbook further comprises topology data indicating services on each machine.

* * * * *